(12) United States Patent
Reith et al.

(10) Patent No.: US 11,242,065 B2
(45) Date of Patent: Feb. 8, 2022

(54) DEVICE AND METHOD FOR CONTROLLING A SIGNAL CONNECTION OF A VEHICLE

(71) Applicant: ZF Friedrichshafen AG, Friedrichshafen (DE)

(72) Inventors: Ulrich Reith, Ravensburg (DE); Thomas Jäger, Meckenbeuren (DE); Mauro Cesar Zanella, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 92 days.

(21) Appl. No.: 16/694,519

(22) Filed: Nov. 25, 2019

(65) Prior Publication Data

US 2020/0172119 A1 Jun. 4, 2020

(30) Foreign Application Priority Data

Dec. 3, 2018 (DE) .......................... 102018220788.7

(51) Int. Cl.
*B60W 50/00* (2006.01)
*B60R 16/023* (2006.01)

(52) U.S. Cl.
CPC ......... *B60W 50/00* (2013.01); *B60R 16/0231* (2013.01)

(58) Field of Classification Search
CPC ............................ B60W 50/00; B60R 16/0231
See application file for complete search history.

(56) References Cited

U.S. PATENT DOCUMENTS

| | | | | |
|---|---|---|---|---|
| 6,240,534 B1* | 5/2001 | Nakane | ............... | G06F 11/0757 700/79 |
| 6,484,082 B1* | 11/2002 | Millsap | ............... | H04L 12/4035 701/32.7 |
| 7,103,460 B1* | 9/2006 | Breed | ................. | B60C 23/0408 701/29.1 |
| 9,008,898 B2* | 4/2015 | Umesaka | ............... | G07C 5/085 701/33.2 |
| 10,040,440 B2* | 8/2018 | Iwagami | ............... | B60W 10/06 |
| 2003/0171858 A1* | 9/2003 | Kondo | .................. | F02D 41/266 701/29.2 |
| 2005/0273218 A1* | 12/2005 | Breed | ..................... | B60R 21/20 701/2 |

(Continued)

FOREIGN PATENT DOCUMENTS

| | | | |
|---|---|---|---|
| CN | 205440234 U | * | 8/2016 |
| DE | 10 2015 222 530 A1 | | 12/2016 |

(Continued)

OTHER PUBLICATIONS

German Office Action cited in corresponding German Application No. 10 2018 220 788.7 dated Aug. 20, 2019 (10 pages).

*Primary Examiner* — Peter D Nolan
*Assistant Examiner* — Peter Y Ning
(74) *Attorney, Agent, or Firm* — Crowell & Moring LLP

(57) ABSTRACT

A device for controlling a signal connection in a vehicle is presented. The signal connection represents a connection between at least one control unit in a vehicle and at least one actuator in the vehicle. The device is configured to establish, and/or monitor, and/or disconnect the signal connection based on an input signal.

16 Claims, 1 Drawing Sheet

(56) References Cited

U.S. PATENT DOCUMENTS

| | | | |
|---|---|---|---|
| 2009/0198407 A1* | 8/2009 | Sakai | B60W 50/0205 |
| | | | 701/29.1 |
| 2009/0312898 A1* | 12/2009 | Hashimoto | G05B 19/0428 |
| | | | 701/29.1 |
| 2012/0004804 A1* | 1/2012 | Beams | G01S 5/0027 |
| | | | 701/32.7 |
| 2014/0164826 A1* | 6/2014 | Aoki | G06F 11/0721 |
| | | | 714/10 |
| 2020/0382339 A1* | 12/2020 | Sonnek | H04L 12/4625 |

FOREIGN PATENT DOCUMENTS

| | | | | |
|---|---|---|---|---|
| DE | 10 2017 101 803 A1 | 8/2018 | | |
| DE | 102017101803 A1 * | 8/2018 | | B60R 25/08 |
| DE | 10 2017 109 865 A1 | 11/2018 | | |

* cited by examiner

DEVICE AND METHOD FOR CONTROLLING A SIGNAL CONNECTION OF A VEHICLE

RELATED APPLICATIONS

This application claims priority from German Patent Application DE 10 2018 220 788.7, filed Dec. 3, 2018, the entirety of which is hereby incorporated by reference herein.

TECHNICAL FIELD

The present invention relates to a method and a control unit for operating an autonomous vehicle.

BACKGROUND

DE 10 2015 222 530 A1 discloses a vehicle electronics control device with a monitoring control circuit unit for monitoring a control operation of a control unit.

SUMMARY

Based on this, the present invention creates an improved device for controlling a signal connection in a vehicle and an improved method for controlling a connection in a vehicle according to the independent claims. Advantageous embodiments can be derived from the dependent claims and the following description.

According to one embodiment, there can be, in particular, an additional control unit in the form of a device, control device, or safety control unit in a vehicle, in order to physically establish, monitor, and potentially physically disconnect a communication or signal transfer between vehicle control units, e.g. for highly automated driving, and actuator control units. As a result, a signal transfer can be enabled, monitored, and disabled between control units and actuators, depending on the situation.

Advantageously, a reliable and safe operation of a vehicle can be achieved in particular according to one embodiment through ensuring a proper communication between control units and actuators by means of a control device or a safety control unit. A signal transfer can be checked to see if it is correct, and enabled if the participating mechanisms are functioning correctly, and disabled in the case of a malfunction.

A device for controlling a signal connection in a vehicle is presented, wherein the signal connection is capable of transferring signals between at least one control unit in a vehicle and at least one actuator in a vehicle, wherein the device is configured to establish the signal connection based on an input signal, and/or to monitor, and/or disconnect the signal connection.

The device can be an electrical unit that processes electrical signals, e.g. sensor signals, and outputs control signals based thereon. The device can have one or more appropriate hardware and/or software interfaces. Hardware interfaces can be part of an integrated circuit, for example, in which functions of the device are implemented. The interfaces can also be independent integrated circuits, or be at least partially composed of discreet components. Software interfaces can be software modules on a microcontroller, for example, in addition to other software modules. The vehicle can be a motor vehicle, in particular a passenger car, a truck, or some other utility vehicle. The device can represent an additional control mechanism or additional control unit for the vehicle. The device can also be referred to as a safety control device.

The at least one control unit can be configured to control operation of the vehicle in the framework of so-called highly automated driving. The at least one actuator can be in the form of a signal link for a vehicle function, e.g. a steering unit, brakes, a valve, etc.

According to one embodiment, the device can be separate from the at least one control unit. Additionally or alternatively, the device can be formed on a separate circuit board. In other words, the device can be located outside a housing of the at least one control unit. Additionally or alternatively, the device can be located inside a housing of a control unit on its own circuit board, with a separate power source and signal connection from that for the control unit. As a result, a practical implementation of the device can be achieved, depending on the application or operating environment, regardless of whether it is a separate unit or integrated in an existing control unit as a separate subunit.

The device can also be configured to establish and/or disconnect the signal connection by actuating a coupling mechanism. The coupling mechanism can be interconnected in the signal connection. The coupling mechanism can be in the form of a so-called gateway, for example. The coupling mechanism can comprise coupling elements for physically establishing and disconnecting the connection. The coupling elements can comprise relays, optocouplers, magnetic couplers, etc. This embodiment offers the advantage that an actuation of an actuator by the control unit via the signal connection can only be enabled when this is intended. The signal connection can be particularly easily and reliably established and/or disconnected via the actuation of the coupling mechanism.

According to one embodiment, the device can be configured to check a signal transferred via the signal connection in the form of an input signal for compliance with at least one predefined signal criterion, in order to monitor the signal connection. The at least one predefined signal criterion can represent a type of transferred data, a repetition rate of a data transfer, exceeding a range, syntactical errors, sequence errors, message counters, message checksums, and/or other signal criteria. In this manner, communication between a control unit and actuators can be reliably and easily checked and monitored.

The device can also be configured to disconnect the signal connection if a signal transferred via the signal connection as an input signal violates at least one predefined signal criterion. The signal that is transferred via the signal connection represents the input signal in this case. Such an embodiment offers the advantage that communication in which a malfunctioning unit or actuator participates can be reliably disabled, in order to maintain or increase operational safety.

The device can also be configured to disconnect the signal connection if a shutdown signal is input by the device as the input signal. In particular, the shutdown signal can represent an emergency shutdown signal or an emergency off signal. The shutdown signal can be provided by an interface to a functional mechanism of the vehicle or a user interface. The shutdown signal represents a command to shut off a highly automated operating mode or driving mode of the vehicle. It is thus possible to react quickly and reliably to sudden events requiring a disabling of the signal connection.

The device can also be configured to disconnect the signal connection if a further signal transferred as the input signal via another signal connection in the vehicle violates at least one predefined signal criterion. The other signal connection can be for the at least one control unit and/or the at least one actuator. The device can be configured in this case to monitor the other signal connection. As a result, it is possible to more reliably determine whether a control unit or an actuator is malfunctioning, and disable the communication path.

The device can also be configured to disconnect the signal connection if the device detects that driving data of the vehicle violate at least one predefined criterion. The driving data can represent at least an acceleration value, a speed, and/or other driving data. Such an embodiment offers the advantage that if the vehicle is not functioning correctly, the signal connection can be reliably disconnected.

According to one embodiment, the device can be configured to output a control signal to the at least one actuator. The control signal can be used by the at least one actuator for bringing the vehicle to a safe state. The vehicle can therefore be reliably brought to a safe state, even if a control unit malfunctions. In this case, the device can function as a substitute control unit, in order to increase the operational safety of the vehicle.

A method for controlling a signal connection in a vehicle is also presented, wherein the signal connection represents a connection for signal transfer between at least one control unit of a vehicle and at least one actuator in the vehicle, wherein the method comprises the following steps:
inputting an input signal; and
controlling the signal connection to establish, and/or monitor, and/or disconnect the signal connection based on the input signal.

The method can be advantageously executed using any of the embodiments of the device specified above.

A computer program product containing program code is also advantageous, which can be stored on a machine readable medium such as a solid state memory, and used for executing the method according to any of the embodiments described above when the program is executed on a computer or a device.

BRIEF DESCRIPTION OF THE DRAWINGS

The invention shall be explained in greater detail in reference to the attached drawings, by way of example. Therein.

DETAILED DESCRIPTION

In the following description of preferred exemplary embodiments of the present invention, the same or similar reference symbols are used for elements with similar functions shown in the various figures, wherein there shall be no repetition of the descriptions of these elements.

Figure 1:
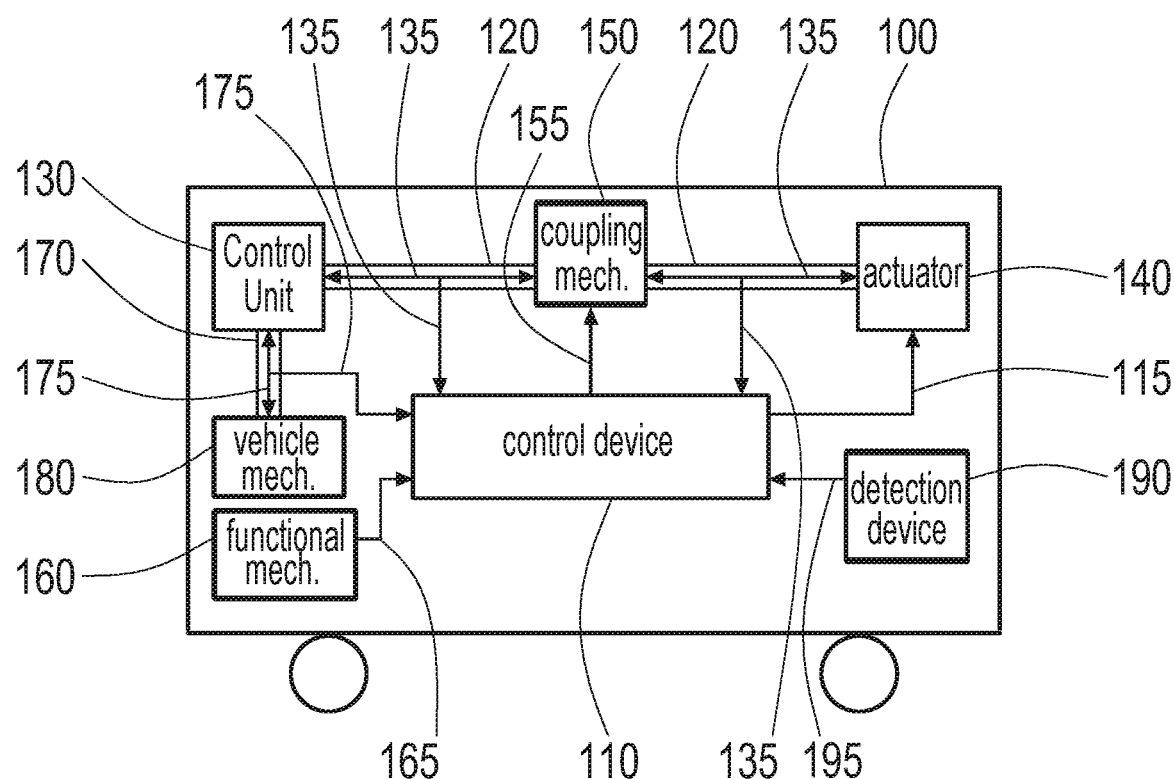
FIG. 1 shows a schematic illustration of a vehicle that has a device according to an exemplary embodiment.

FIG. 1 shows a schematic illustration of a vehicle 100 with a device 110 according to an exemplary embodiment. The vehicle 100 is a motor vehicle, e.g. a passenger car, truck, or some other utility vehicle. The device 110 is configured to control a signal connection 120 in the vehicle 100. The device 110 can also be referred to as a control device 110 or a so-called safety ECU (ECU: Electronic Control Unit, or control device; "Steuergerät" in German).

At least one control unit 130 and at least one actuator 140 are connected to one another for signal transfer by means of the signal connection 120. The signal connection 120 is, e.g., an electrical line, optical line, or some other connecting element for transferring signals. The vehicle 100 thus contains the device 110 or control device 110, the signal connection 120, the at least one control unit 130, and the at least one actuator 140. According to the exemplary embodiment shown herein, the vehicle 100 contains the control device 110, the signal connection 120, merely by way of example a control unit 130, and merely by way of example an actuator 140. The control unit 130 is configured, e.g., to control functions for highly automated driving. The actuator 140 can also contain a control mechanism, or actuator control mechanism.

In order to control the signal connection 120, the control device 110 is configured to establish, and/or monitor, and/or disconnect the signal connection 120 based on an input signal. The input signal shall be explained in greater detail below.

According to the exemplary embodiment shown herein, the control device 110 is separate from the control unit 130. According to another exemplary embodiment, the control device 110 can be located with the control unit 130 or another control unit in a common housing, and formed on its own, or on a separate circuit board. The control device 110 can be formed, e.g. as a sub-element, e.g. a plug-in circuit board, etc., as part of a control unit. It should be noted in particular here that the computers, as well as input and output elements, function and operate independently.

Furthermore, there is a coupling mechanism 150 in the exemplary embodiment shown herein. The coupling mechanism 150 is interconnected in the signal connection 120. The control device 110 and the coupling mechanism 150 are connected to one another for signal transfer. The control device 110 is configured to actuate the coupling mechanism 150 to establish and/or disconnect the signal connection 120 by means of the coupling mechanism 150. For this, the coupling mechanism 150 is configured to output an actuating signal 155 to the coupling mechanism 150. The coupling mechanism 150 is configured to enable, or block or disable, the signal connection 120 in response to the actuating signal 155.

The control device 110 is thus configured to physically establish, and/or disconnect the signal connection 120 by means of the coupling mechanism 150 in particular. In order to ensure that, e.g., driver assistance system functions, or ADAS functions (ADAS: advanced driver assistance system) of the vehicle 100 can only be active when desired, the signal connection 120 between the control unit 130 and the actuator 140, or the actuator control mechanisms is not conducted via the coupling mechanism 150 that can be disconnected, e.g. a so called gateway. The setting of a switch connected to the control device 110, potentially a key switch, can be detected by the control device 110, and the coupling mechanism 150 can be activated, depending on the switch setting. The activation of the coupling mechanism 150 can take place by connecting the coupling mechanism 150 to a power supply. Without a power supply, the coupling mechanism 150 is deactivated, wherein the signal connection 120 is disabled between the control unit 130 and the actuator 140. With a power supply, the contact mechanism 150 can be activated, wherein the signal connection 120 is established. An activation of the signal connection 120 can also take place by supplying power to coupling elements of the coupling mechanism 150. The coupling mechanism 150 can already be connected to a power supply, and the coupling elements that establish the signal connection 120, e.g. relays, optocouplers, magnetic couplers, etc., do not have to be supplied with power. The signal connection 120 can first be established when these elements are supplied with power simulated by the control device 110, or through the actuating signal 155.

In order to monitor the signal connection 120, the control device 110 is configured according to one exemplary embodiment to tap into and analyze a signal transferred between the control unit 130 and the actuator 140 via the signal connection 120. In this case, the control device 110 is configured to check whether the data signal 135 complies with at least one predefined signal criterion, in order to monitor the signal connection.

The signal connection 120 between the control unit 130 and the actuator 140 can be checked by the control device 110. With an exchange of data, or data signals 135, between the control unit 130 and the actuator 140, it is established, e.g., which data are exchanged at which repetition rate. The control device 110 can be configured to read these data, and determine, e.g., whether the data have been sent at the accepted repetition rate, and whether ranges have been exceeded, there are syntactical errors, sequence errors (three valid signals are to be transmitted in a defined sequence, for example, for an intended gear change), etc. If message counts, message checksums, etc. are also exchanged, the control device 110 can also check whether these correspond to accepted patterns for signal criteria or signal properties, and thus determine whether the communication channels are functioning and the control units and actuators are thus functioning properly.

According to one exemplary embodiment, the control device 110 is configured to disconnect the signal connection 120 if the data signal 135, or the signal 135 transferred via the signal connection as an input signal, violates at least one predefined signal criterion. If the control device 110 determines that accepted conventions or signal criteria have not been maintained when monitoring the signal connection 120 between the control unit 130 and the actuator 140, e.g. in the case where ranges have been exceeded, the checksum calculation is incorrect, there are jumps in the message counter, or it is stuck, etc. the control device 110 can terminate the communication via the signal connection 120. The control device 110 can be configured to suspend the power supply to the coupling mechanism 150, e.g. a complete gateway, or to the coupling elements, e.g. relays, optical or magnetic couplers, etc. The power supply to the coupling mechanism 150 or the coupling elements can also be interrupted by the control device 110 when a switch or key switch that activated the coupling is switched off. The vehicle 100 can thus be operated conventionally in certain situations, without the risk of the control unit for highly automated driving acting on the vehicle 100.

According to one exemplary embodiment, the control device 110 is configured to input a shutdown signal 165 as an input signal. The shutdown signal 165 is an emergency shutdown signal, or emergency off signal, for example. Such a shutdown signal 165 can be input by an interface to a functional mechanism 160 of the vehicle 100. Alternatively, such a shutdown signal 165 can be input from a user interface. The control device 110 is configured to disconnect the signal connection 120 in response to an input shutdown signal 165. If emergency off switches are incorporated, or connected wirelessly, the power supply to the coupling mechanism 150 can be interrupted by the control device 110 if at least one emergency off switch has been actuated. Alternatively, coupling elements (relays, optical and magnetic couplers, etc.) in the coupling mechanism 150 can be disconnected from the power supply after at least one emergency off switch has been actuated. Emergency off switches, or shutdown signals 165 can also be input from the control device 110, and the control device 110 can interrupt the power supply to the coupling mechanism 150 and/or the coupling elements when it is actuated. Shutdown signals 165 can also be input from another control unit, and the actuation can be reported to the control device 110. The control device 110 can then decide whether the signal connection 120 should be disconnected or maintained.

According to one exemplary embodiment, the control device 110 is configured to monitor another signal connection 170 in the vehicle 100. The other signal connection 170 is configured in accordance with the exemplary embodiment depicted herein to connect the control unit 130 and another vehicle mechanism 180 for signal transfer. Another data signal 175 can be transferred via the other signal connection 170 between the control unit 130 and the other vehicle mechanism 180. The control device 110 is configured in this case to tap into the other data signal 175 and input it as an input signal. The control device 110 is also configured to disconnect the signal connection 120 if the other data signal 175 violates at least one predefined signal criterion. In other words, the control device 110 also monitors other communication channels, in addition to a signal connection 120 that can be disconnected, such as the other signal connection 170, and disables or disconnects the signal connection 120 when the control device 110 determines that a function, interaction, or communication of the control unit 130 with the vehicle 100 is no longer possible, meaningful, or advisable.

According to one exemplary embodiment, the control device 110 is configured to input a driving data signal 195 representing driving data for the vehicle 100 from an interface to a detection device 190 in the vehicle 100. The detection device 190 is configured, e.g., to detect and provide at least an acceleration value, a speed, and/or other driving data for the vehicle as driving data. The control device 110 is configured in this case to disconnect the signal connection 120 if at least one predefined driving data criterion is violated by the driving data for the vehicle 100. In other words, the control device 110 is configured to monitor the driving data for the vehicle to determine if threshold values have been exceeded, e.g. if the maximum speed has been exceeded, etc. If the vehicle 100 is travelling too fast, despite the corresponding inputs, the control device 110 can disconnect the signal connection in order to terminate the communication between the control unit 130 and the actuator 140.

According to one exemplary embodiment, the control device 110 is configured to output a control signal 115 to the actuator 140. More precisely, the control device 130 is configured to output the control signal 115 to the actuator 140 when the signal connection 120 is disconnected by the control device 110. In particular, the control signal 115 can be used by the actuator 140 to bring the vehicle to a safe state. If the control device 110 decides to disconnect the signal connection 120 between the control unit 130 and the actuator 140, the control device 110 sends the control signal 115 to the actuator 140 in order to bring the vehicle 100 to a safe state. The control signal 115 can thus be used to reduce a motor torque and/or actuate a braking system.

Figure 2:
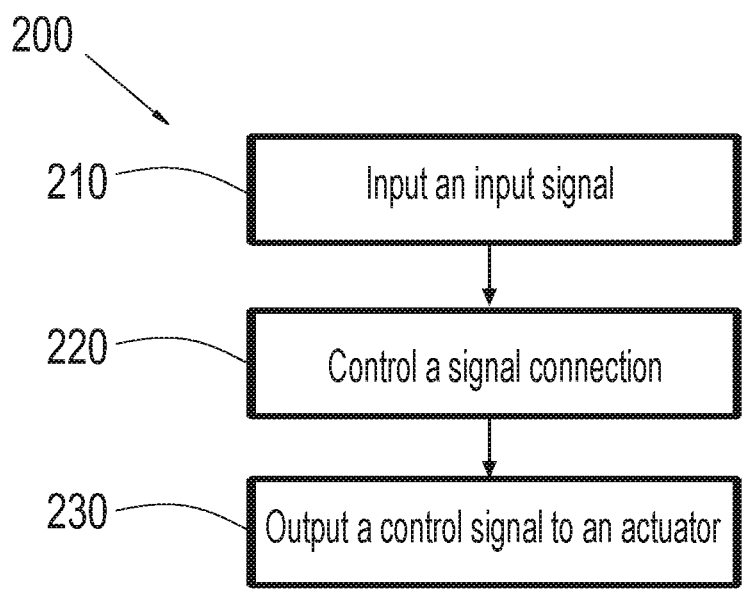
FIG. 2 shows a flow chart for a control method according to an exemplary embodiment.

FIG. 2 shows a flow chart for a control method 200 in accordance with an exemplary embodiment. The method 200 can be executed to control a signal connection in a vehicle. The control method 200 can be executed in conjunction with, or using, the device shown in FIG. 1, or a similar device. More precisely, a signal connection can be controlled by executing the method 200, which represents a connection for signal transfer between a control unit in a vehicle and at least one actuator in the vehicle.

An input signal is input in an input step 210 in the control method 200. The signal connection is subsequently controlled in a control step 220, in order to establish, and/or monitor, and/or disconnect the signal connection based on the input signal. In other words, the signal connection is controlled based on the input signal in the control step 220, wherein the signal connection is established, and/or monitored, and/or disconnected in the control step 220.

In particular, if the signal connection is disconnected in the control step 220, according to one exemplary embodiment, a control signal is output to the at least one actuator in an output step 230. The control signal can be used by the at least one actuator therein to bring the vehicle to a safe state.

The exemplary embodiments shown in and described in reference to the figures have only be selected by way of example. Different exemplary embodiments can be combined with one another, either in their entirety or with respect to individual features. An exemplary embodiment can also be supplemented by the features of another exemplary embodiment.

Furthermore, method steps according to the invention can be repeated and executed in a sequence other than that described herein.

If an exemplary embodiment comprises an "and/or" conjunction between a first feature and a second feature, this can be read to mean that the exemplary embodiment according to one embodiment contains both the first feature and the second feature, and according to another embodiment contains either just the first feature or just the second feature.

REFERENCE SYMBOLS 100 vehicle
110 device for controlling, or control device
115 control signal
120 signal connection
130 control device
135 data signal
140 actuator
150 coupling mechanism
155 actuation signal
160 functional mechanism
165 shutdown signal
170 other signal connection
175 other data signal
180 other vehicle mechanism
190 detection device
195 driving data signal
200 control method
210 input step
220 control step
230 output step

The invention claimed is:

1. A device for controlling a first signal connection in a vehicle, wherein the first signal connection represents a connection for signal transfer between at least one control unit in a vehicle and at least one actuator in the vehicle, wherein the device is configured to:
    establish the first signal connection;
    monitor the first signal connection;
    receive a first input signal from the first signal connection;
    disconnect the first signal connection based on the first input signal;
    monitor a second signal connection that is different from the first signal connection, the second signal connection for at least one of the at least one control unit, another control unit, the at least one actuator, or another actuator;
    receive a second input signal from the second signal connection;
    determine that the second input signal violates at least one predefined second signal criterion; and
    disconnect the first signal connection in response to determining that the second signal violates the at least one predefined second signal criterion.

2. The device according to claim 1, wherein the device is separate from the at least one control unit and formed on a separate circuit board from the at least one control unit.

3. The device according to claim 1, wherein the device is configured to establish and disconnect the first signal connection by actuating a coupling mechanism, wherein the coupling mechanism is interconnected in the first signal connection.

4. The device according to claim 1, wherein the device is configured to check a signal transferred as the input signal via the first signal connection for compliance with at least one predefined signal criterion in order to monitor the first signal connection.

5. The device according to claim 1, wherein the device is configured to disconnect the first signal connection if the first signal transferred as the input signal via the first signal connection violates at least one predefined signal criterion.

6. The device according to claim 1, wherein the device is configured to disconnect the first signal connection if a shutdown signal is input by the device as the input signal, wherein the shutdown signal represents an emergency shutdown signal.

7. The device according to claim 1, wherein the device is configured to:
    output a control signal to the at least one actuator, wherein the control signal is used by the at least one actuator to bring the vehicle to a safe state.

8. The device according to claim 1, wherein the device is configured to:
    output a control signal to another actuator, wherein the control signal is used by the other actuator to bring the vehicle to a safe state.

9. A method for controlling a first signal connection in a vehicle, wherein the first signal connection represents a connection between at least one control unit in the vehicle and at least one actuator in the vehicle, the method comprising:
    monitoring, by a device, a second signal connection that is different from the first signal connection, the second signal connection for at least one of the at least one control unit, another control unit, the at least one actuator, or another actuator;
    receiving, by the device, a second input signal from the second signal connection;
    determining, by the device, that the second input signal violates at least one second predefined signal criterion; and
    disconnecting, by the device, the first signal connection in response to determining that the second signal violates the at least one second predefined signal criterion.

10. A non-transitory computer program product that has computer code, which can be stored on a machine readable medium and can be used for executing the method according to claim 9 when the computer program product is executed by at least one of a computer or the device.

11. The method according to claim 9, further comprising:
controlling the first signal connection by the device by actuating a coupling mechanism, wherein the coupling mechanism is interconnected in the first signal connection.

12. The method according to claim 9, further comprising:
monitoring the first signal connection by checking the first signal transferred as the input signal via the first signal connection for compliance with at least one first predefined signal criterion.

13. The method according to claim 12, further comprising:
disconnecting, by the device, the first signal connection in response to determining the first signal transferred as the input signal via the first signal connection violates the at least one first predefined signal criterion.

14. The method according to claim 9, further comprising:
disconnecting, by the device, the first signal connection in response to receiving a shutdown signal as the input signal, wherein the shutdown signal represents an emergency shutdown signal.

15. The method according to claim 9, further comprising:
outputting, by the device, a control signal to the at least one actuator, wherein the control signal is used by the at least one actuator to bring the vehicle to a safe state.

16. The method according to claim 9, further comprising:
outputting, by the device, a control signal to another actuator, wherein the control signal is used by the other actuator to bring the vehicle to a safe state.

* * * * *